US009792735B2

(12) United States Patent
Elliott

(10) Patent No.: US 9,792,735 B2
(45) Date of Patent: Oct. 17, 2017

(54) METHOD AND SYSTEM FOR PERFORMING TELEMATICS FUNCTIONS USING A SOLAR POWERED WIRELESS COMMUNICATION DEVICE

(75) Inventor: Bryant Elliott, Johns Creek, GA (US)

(73) Assignee: Verizon Telematics Inc., Atlanta, GA (US)

( * ) Notice: Subject to any disclaimer, the term of this patent is extended or adjusted under 35 U.S.C. 154(b) by 973 days.

(21) Appl. No.: 13/360,504

(22) Filed: Jan. 27, 2012

(65) Prior Publication Data

US 2012/0197486 A1 Aug. 2, 2012

Related U.S. Application Data

(60) Provisional application No. 61/436,949, filed on Jan. 27, 2011.

(51) Int. Cl.
*G06F 7/00* (2006.01)
*G07C 5/00* (2006.01)

(52) U.S. Cl.
CPC .................................... *G07C 5/008* (2013.01)

(58) Field of Classification Search
USPC .... 701/22, 24, 33.2, 33.3, 33.4, 69, 99, 490; 340/901–904, 636.1, 636.19, 693.2, 340/693.7, 7.32, 393.2
See application file for complete search history.

(56) References Cited

U.S. PATENT DOCUMENTS 6,738,697 B2 * 5/2004 Breed ...................... B60C 11/24 701/31.5
7,350,608 B2 * 4/2008 Fernandez ................ B60L 1/00 180/65.1
7,353,897 B2 * 4/2008 Fernandez ................ B60L 1/00 180/65.8
7,374,003 B1 * 5/2008 Fernandez ................ B60L 1/00 180/65.8
7,980,341 B2 * 7/2011 Fernandez ............... 180/65.275
2002/0159270 A1 * 10/2002 Lynam ................... B60K 35/00 362/492
2005/0004723 A1 * 1/2005 Duggan ............... G05D 1/0061 701/24
2005/0128751 A1 * 6/2005 Roberge ..................... F21K 9/00 362/276
2006/0002110 A1 * 1/2006 Dowling ................... F21K 9/00 362/249.05

(Continued)

*Primary Examiner* — Atul Trivedi

(57) ABSTRACT

A battery-powered vehicle telematics device includes solar cells for powering the device and charging the battery. A Bluetooth® link connects the telematics device to a dongle that has been coupled to a diagnostic port of the vehicle. A USB computer connection may also provide power to the telematics device to assist the solar cells in charging the battery. The dongle and telematics devices include accelerometer components that can detect a start event and signal that the telematics device should begin operating. The accelerometers can also be used to calculate a roll angle. The telematics device can transmit a roll angle value to an active handling system or to a central server along with other vehicle information received from the dongle for further analysis and processing. A processor in the telematics device can automatically adjust and optimize the solar cell angle to maximize the capture of incident radiation.

20 Claims, 6 Drawing Sheets

(56) References Cited

U.S. PATENT DOCUMENTS

| | | | | |
|---|---|---|---|---|
| 2006/0022214 | A1* | 2/2006 | Morgan | F21K 9/00 257/99 |
| 2007/0145915 | A1* | 6/2007 | Roberge | F21K 9/00 315/312 |
| 2007/0205881 | A1* | 9/2007 | Breed | B60C 23/0433 340/447 |
| 2008/0225538 | A1* | 9/2008 | Lynam | B60K 35/00 362/494 |
| 2008/0269971 | A1* | 10/2008 | Fernandez | B60L 1/00 701/22 |
| 2009/0267540 | A1* | 10/2009 | Chemel | F21S 9/043 315/297 |
| 2009/0312896 | A1* | 12/2009 | Fernandez | B60L 1/00 701/22 |
| 2010/0045790 | A1* | 2/2010 | Lynam | B60K 35/00 348/140 |
| 2010/0168949 | A1* | 7/2010 | Malecki | G05D 1/0676 701/24 |
| 2010/0262325 | A1* | 10/2010 | Fernandez | B60L 1/00 701/22 |
| 2011/0001436 | A1* | 1/2011 | Chemel | H05B 37/029 315/291 |

* cited by examiner

METHOD AND SYSTEM FOR PERFORMING TELEMATICS FUNCTIONS USING A SOLAR POWERED WIRELESS COMMUNICATION DEVICE

CROSS REFERENCE TO RELATED APPLICATIONS

This application claims priority under 35 USC sec. 119 to U.S. Provisional Patent Application No. 61/436,949 entitled "Method and system for performing telematics functions in a vehicle using a solar powered communication device" having a filing date of Jan. 27, 2011, which this application incorporates herein by reference in its entirety.

FIELD

The invention relates to a telematics device wirelessly receiving vehicle information available on a vehicle communication bus.

BACKGROUND

Telematics devices facilitate connecting a vehicle with a communications network. A telematics control unit ("TCU") installed in a vehicle typically comprises a global positioning satellite ("GPS") circuit, or module, wireless communication circuitry, including long range wireless (e.g., cellular telephony and data services) and short range wireless ("Bluetooth") capabilities. A TCU typically includes at least one processor that controls, operates, and manages the circuitry and software running thereon, and also facilitates interfacing with a vehicle data bus.

For example, a TCU installed by a vehicle's original equipment manufacturer ("OEM") such as Ford, Toyota, BMW, Mercedes Benz, etc., typically couples directly to the corresponding vehicle's data bus, such as, for example, a controller area network ("CAN") bus, an international standards organization ("ISO") bus, a Society of Automotive Engineers ("SAE") bus, etc. The TCU can process and communicate information retrieved from the bus via links of the wireless communication networks, to a user's mobile device local to the vehicle, or a computer device remote from the vehicle. An OEM typically cautiously guards access by third party software to a vehicle's bus through a TCU because of the potential of computer virus infection, other malware, and software and data that although innocuous may nonetheless interfere with operation of the vehicle, which could expose the OEM to warranty liability and other liability.

Aftermarket vendors have begun packaging some components of a TCU in a module that plugs into a diagnostic connection of a vehicle, such as, for example, and OBD, or OBD-II port. Those of ordinary skill in the art typically refer to such a self-contained device as a 'dongle.' In addition, aftermarket vendors have also begun marketing a rear-view-mirror that includes some components of a TCU. A dongle typically receives power from the battery voltage power pin of the diagnostic port. The aftermarket rear view mirrors typically receive power through a wire, and trained technicians typically install the TCU mirrors.

SUMMARY

A TCU communicates vehicle information to a central host telematics server, which provides gatekeeper functionality in forwarding messages to and receiving messages from, a TCU coupled to a vehicle bus.

A dongle, which may be referred to herein as a 'vehicle information transceiver,' can contain components that communicate messages (e.g., voice and data) from the vehicle to a central server, such as a server maintained and operated by a telematics service provider. These components can include global positioning satellite circuitry, firmware, and software. The components can also include a long range wireless communication processor and related circuitry, such as, for example, a processor for performing voice compression and decompression algorithms, radio transceiver circuitry for transmitting and receiving data and voice signals over a long range wireless communication network, memory coupled to the processor. In addition, the components of a dongle can include a short range wireless transceiver, such as Bluetooth® or Wi-Fi, or similar. Other components may include accelerometers, barometric pressure sensors, microphone, speakers, buttons, and a display. Moreover, the dongle may only include interface circuitry for interfacing with a diagnostic system of the vehicle and a short range wireless transceiver.

A dongle typically connects to a vehicle data and information bus, such as a CAN, or similar diagnostics bus, via a connector, such as an OBD, OBD-II, or similar connector. The processor of the dongle receive various vehicle information from signals received through the diagnostic connector connection and processes, derives, and transforms the information before transmitting it to a central server, or user device such as a smart phone. The processor can also receive signals from a central server or smart phone, via a long range or short range wireless connection, or via a wired connection, process the received signal, and transfer the processed signal, via the diagnostic connection to the vehicle bus. The signal received from the server and transferred to the vehicle bus can be used to update software for any of myriad hardware and firmware modules on-board the vehicle, as well as to control aspects of the vehicle, such as remote control of the vehicle. Also, signals from sensors that are part of the dongle and/or a separate device working with the dongle can be used to control operating systems of the vehicle, such as the braking, steering, throttle, and active suspension systems.

In another aspect, the components described above as composing a dongle can be distributed amount multiple devices, such as the dongle and a device remote from the dongle. The remote-from-the-dongle device may be a rear view mirror, or an attachment to a rear view mirror. Or, the remote device can attach to a sun visor or can be located elsewhere in the vehicle. The remote device can include sensors, such as accelerometers and barometers, the long range wireless processor, and the GPS components, leaving only a low capability (with low power use) processor and accelerometers (and perhaps a barometer) in the dongle that couples to the vehicle bus. In such a scenario, the dongle might also include other sensors such as a barometer or biometric sensor. The dongle and barometer can communicate with one another via a short range wireless transceiver in each. In such an embodiment, the low capability, and thus small, dongle retrieves vehicle operational information, and other information, through the diagnostic port and transmits it via Bluetooth, or similar protocol, to the remote device, such as may be incorporated into a rear view mirror. The rear view mirror device then forwards the vehicle information received from the dongle to a central server via a long range wireless modem contained in it, or via short range wireless to another device, such as a smartphone, which could use its long range wireless modem to forward the vehicle information to the central server. Alternatively, the remote device may be a smart phone, or similar personal device such as a tablet or personal computer, which can receive information from the dongle over the short range wireless link and forward the information to a server for further processing. In addition, the smart phone or table can generate control signals and forward them via the short range wireless link to the dongle which can then forward the signals to various modules in the vehicle.

In the rear view mirror and visor-mounted embodiment, the remote device can include a battery, or other energy storage source, for powering the various components included in the remote device. The device can receive energy to recharge the battery via a wire, such as, for example, a cable connected to a USB port, or similar, that includes a power source wire, or pin, that typically provides vehicle battery voltage—nominally 12 volts DC. In an aspect, instead of a wire, a light powered energy source, such as a solar cell, or similar, is mounted on the remote device such that when the remote device is mounted in its operational location (a rear view mirror mounted to the windshield or rooftop near the windshield, or a device clipped to a sun visor so that it faces the windshield) the light powered energy source can collect energy from the sun and convert it to energy for charging the battery, or for powering the components of the remote device if the battery is dead, or missing from the device.

In an aspect, the light powered energy source is mounted on an adjustable arm that is mechanically attached to the remote device. The adjustable mount allows the light powered source to substantially face incident light to maximize the light, and thus, the energy contained therein, received from the light source and converted into electrical energy by the light powered energy source. Since the light incident on a plane is proportional to the sine of the angle that the light source forms with the plane, and maximum light impinging on the planar surface occurs when a ray of the light is perpendicular to the surface of the plane (sin 90°=1), the angle of the solar cell can vary with respect to incoming light by about 25° and still receive approximately 90% of the light radiation it would receive if it were oriented exactly perpendicularly to the impinging radiation.

Thus, precise orientation of the solar cell with respect to the sun is not critical, however, the closer to perpendicular, the more output from the solar cell, and the faster the battery can recharge, or the more power is available for components operating in the remote device. In addition, precise orientation probably isn't as important on a cloudy day as on a sunny day, since clouds tend to diffract light from the sun and thus light radiation is less directional than on a sunny day, although the power output from the solar cell will also typically be less than on a sunny day, even if the solar cell is optimally oriented on the cloudy day, and less than optimally oriented on the sunny day. Thus, orientation with respect to perpendicular of +/− less than 25° is probably sufficient to achieve an adequate charging rate from the solar cell of batteries that power the remote telematics device components.

The remote telematics device may also include a battery health monitor, such as an analog gauge or and LED cluster, or similar (such as a colored icon on a smart phone). The battery health monitor may read batter voltage directly, or it may receive a signal from the device's processor that indicates $V_{CC}$ for example. In addition to monitoring battery health (typically battery voltage) the battery health monitor can instead provide feedback as to the orientation of the solar cell with respect to perpendicular to the angle of light radiation upon it. For example, if the user uses a user interface on the remote telematics device, such as a button, or a button on a smartphone application, he, or she, may select a function that causes the battery health monitor act as a solar cell output gauge instead of a battery voltage meter, Acting as a solar cell output gauge, an LED cluster of the battery health monitor can illuminate a red LED if the orientation of the solar cell deviates greater than a predetermined amount of degrees from perpendicular, for example 33°. If the orientation deviation is less than 33° but greater than, for example, 25°, the processor of the remote telematics device could illuminate a yellow LED, and if deviation of the orientation of the solar cell panel with respect to perpendicular to incident light radiation is less than 25°, the processor could cause a green LED of the cluster to illuminate. Thus, a user has a visual indication to help orient the solar cell to help maximize the power output of the solar cell.

In another aspect, an audio sound could indicate that the orientation of the solar cell with respect to incident light radiation is within a predetermined criteria, or tolerance. Much like a carpenter uses a stud finder to locate wall studs behind a Sheetrock® wall, a driver could use the audio sound to orient the solar panel while driving without having to divert attention from the road to look at the LED cluster, or other visual indication of solar cell output.

In either embodiment, the processor, or the battery health monitor acting as a solar cell alignment indicator can use a variety of references to establish a relationship between the solar panel being perpendicular to incident light radiation. For example, a predetermined value of power output from the solar panel can be used. The telematics device processor can receive current weather forecasts over the long range wireless communications network and compute, based on the day of the year, what the energy output should be for a given solar panel size and efficiency rating. Alternatively, as the vehicle moves along given route, which presumably includes traveling along some hilly and curvy terrain, the processor of the telematics device can sample solar panel output values during a calibration period and use the maximum output value detected during the period as the maximum output value for the given solar panel. Thus, the processor can base the angular orientation optimization of the solar panel on the highest output of the panel during the calibration period.

In another aspect, the remote telematics device may include a motorized coupling to the adjustable solar panel such that the processor can determine that the panel needs adjusting based on comparing the panel's output to the maximum output, whether the predetermined value or the sampled value as discussed above. The processor can cause motors to move the panel to achieve higher outputs of the panels, even as the vehicle travels along a route. However, as the motors may draw more power than the output of the solar panel, the processor could determine whether to disable to the motorized feature, for example, on a cloudy day, or during certain periods of the day (e.g., dusk until dawn.)

In another aspect, the processor could compare outputs from accelerometers in the remote telematics device located high in the vehicle, for example in the rear view mirror attached near the roof to the vehicle, and accelerometers in the dongle, which typically couples to a diagnostic port below the dash board of the vehicle. Communicating accelerometer values between the dongle and the remote device, the processor thereof can calculate the angle of body roll based on differences in outputs of the separately located accelerometers, generate a suspension control signal based on the calculated body roll angle, and communicate the suspension control signal to the vehicle bus via short range wireless signal to the dongle, which in turn would communicate the signal to appropriate modules of the vehicle, for example, one, or more, controllers of magneto rheological shock absorbers. A user, or installer, may use a user interface to configure the locations of the dongle and the remote telematics device. For example, the user interface may present an input screen for inputting the location of the remote telematics device (e.g., rear view mirror) and the location of the dongle (e.g., plugged into a diagnostic port). The interface may also present an input screen, field therein, or other similar means for receiving input from a user, that receives a vehicle make, model, and year model. The processor of the telematics device can access a database, either locally or remotely, that provides dimensions of the vehicle with respect to the distance apart of the mirror location and the dongle location, and the roll center height of the vehicle relative to the locations of the dongle and the mirror. The processor can then use output signals from the respective accelerometers components of the dongle and remote telematics device, and determine a roll angle of the vehicle's body based on movement of the accelerometers relative to the roll center of the vehicle. Since each vehicle has different elevations of the rear view mirror and diagnostic port relative to the elevation of the vehicle's roll center, providing an input interface to receiving vehicle-specific device location information aids in providing an accurate roll center calculation that an active suspension system can use in counteracting the roll of the vehicle.

In another aspect, even if a vehicle does not include an active handling system that can use a measured roll angle, the roll angle of a vehicle may be information that an entity, such as an insurance company, could use in calculating insurance premiums for a given driver, or use in otherwise calculating a driver's 'driving score.' For example, if a user has frequent high roll angle events for a given vehicle, the insurance company may raise his, or her, insurance premiums. Or, measuring a roll event may mitigate a negative adjustment that an insurance company may make to a customer's monthly premium charged that is based on a large number of high-lateral-load turns—a vehicle that stays flat (less roll) may produce higher lateral loads through a turn, yet be safer because a vehicle that doesn't roll can hold the road better in a turn and thus would be less likely to induce a driver to lose control of the vehicle. Thus, the processor in the remote telematics device, whether substantially permanently mounted to the vehicle (e.g., rear view mirror, sun visor, or other location near the roof via Velcro, adhesive, or clips) or removably located in a cradle near the roof (or vertically higher than the diagnostic port), such as for example a cradle for receiving a smartphone wherein the smartphone is the remote telematics device that communicates with the dongle via Bluetooth, or similar, can determine a roll angle of the vehicle and not only generate a signal and transmit it to the vehicle but, but it can transmit the signal via long range wireless communication protocol toward a central computer server, such as a telematics services provider's server.

DETAILED DESCRIPTION

As a preliminary matter, it will be readily understood by those persons skilled in the art that the present aspects are susceptible of broad utility and application. Many methods, embodiments, aspects, and adaptations other than those herein described, as well as many variations, modifications, and equivalent arrangements, will be apparent from or reasonably suggested without departing from the substance or scope described herein.

Accordingly, while a detailed description in relation to preferred embodiments has been given, it is to be understood that this disclosure is only illustrative and exemplary and is made merely for the purposes of providing a full and enabling disclosure. The following disclosure is not intended nor is to be construed to limit or to exclude other embodiments, adaptations, variations, modifications and equivalent arrangements, the present invention being limited only by the claims appended hereto and the equivalents thereof.

Figure 1:
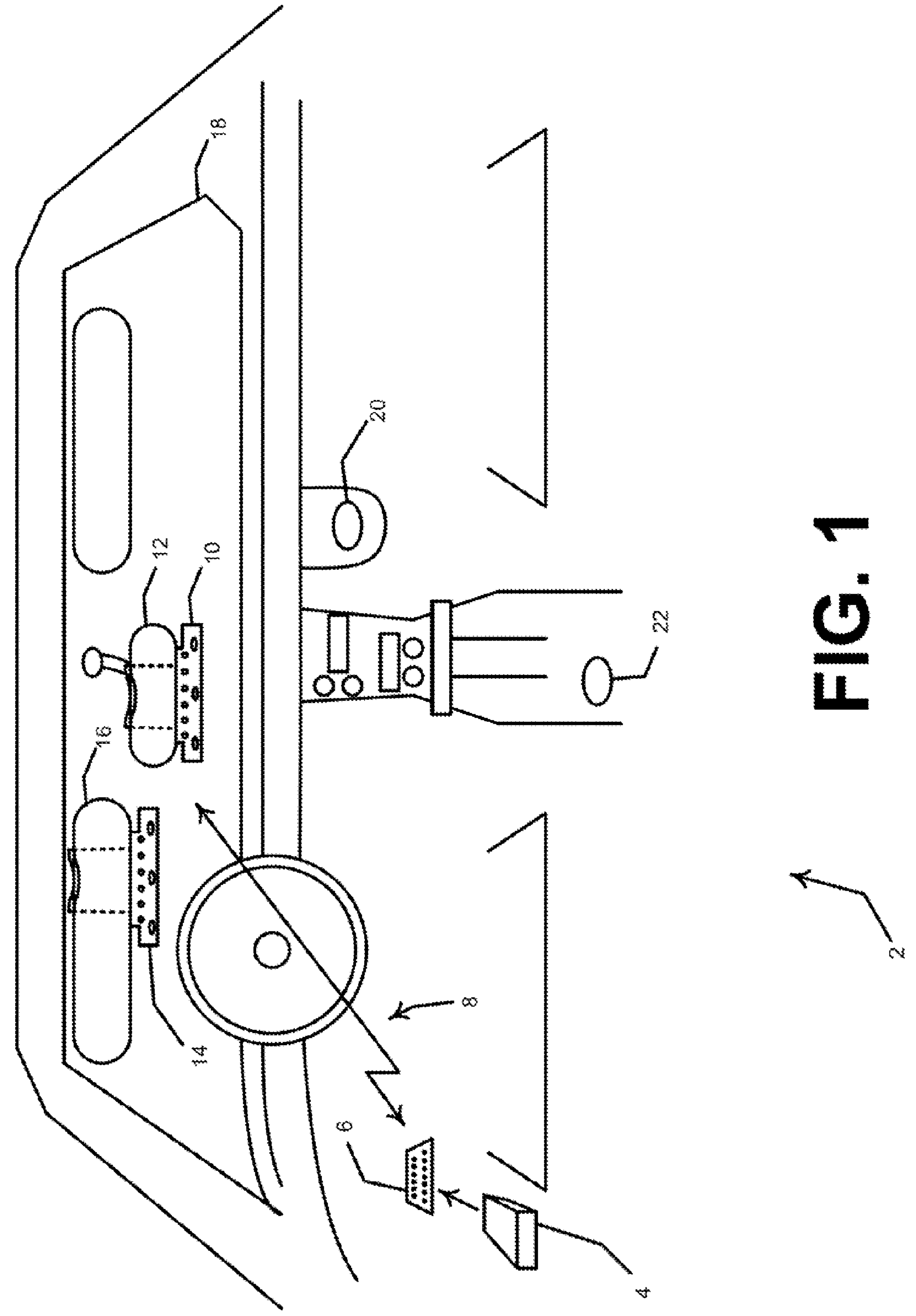
FIG. 1 illustrates a cockpit of a vehicle with a dongle diagnostic device and remote telematics device.
Figure 2:
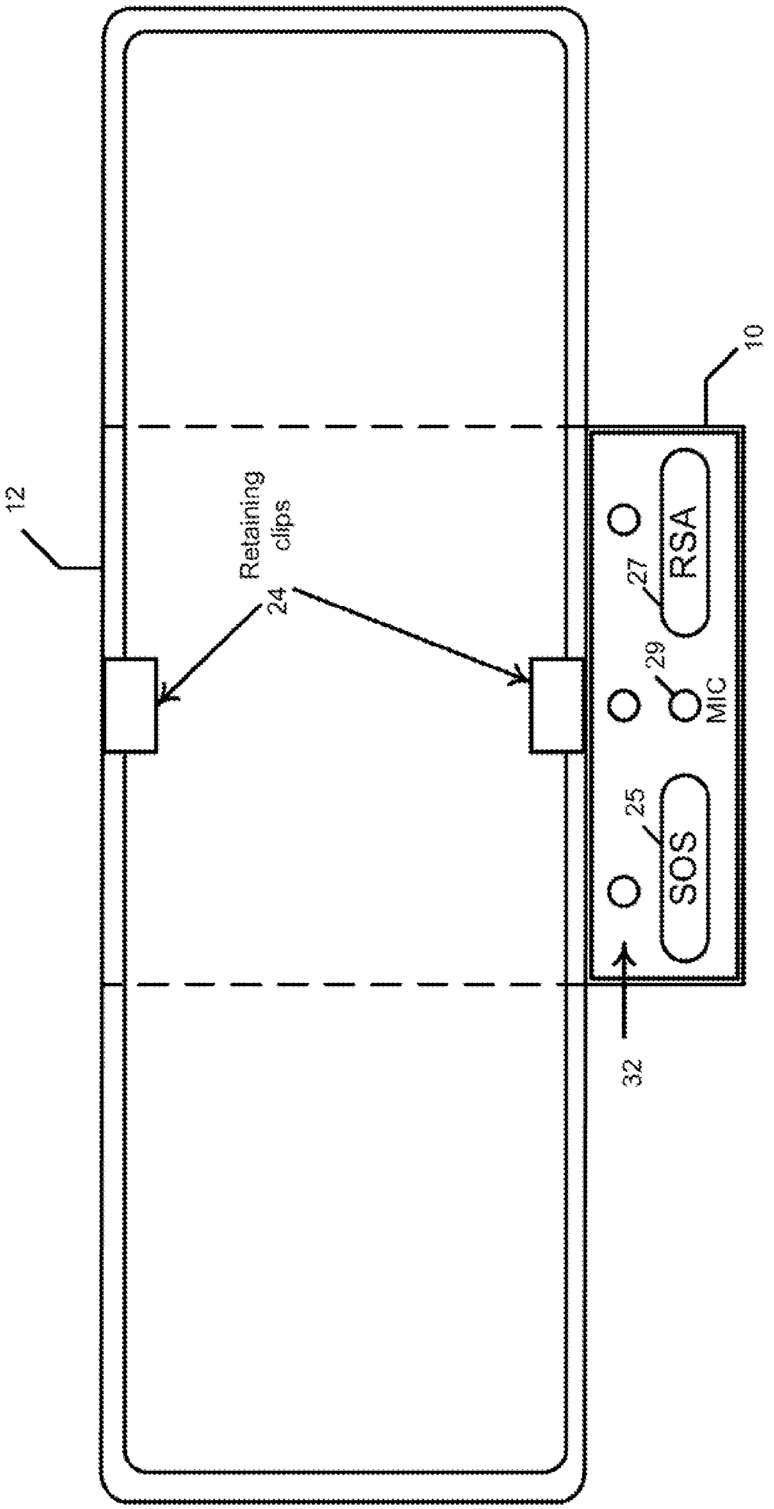
FIG. 2 illustrates a front elevation view of a remote telematics device clipped to the back of a rear view mirror.

FIG. 1 illustrates a cockpit 2 of a vehicle. In the cockpit, the figure shows a diagnostics dongle 4 that couples into diagnostics port 6 of the vehicle. The figure shows diagnostics dongle 4 decoupled from port 6, for clarity. When coupled into port 6, dongle 4 can communicate via two way short range communication link 8 with other devices. An example of a short range wireless link is Bluetooth®, but other types of communication link can be used, such as for example wi-fi and the like. In the figure, dongle 4 can communicate with a remote telematics device 10 that clips to a rear view mirror 12 of the vehicle, or a remote telematics device 14 that clips to sun visor 16. Both of these mounting locations, sun visor 16 or mirror 12, provide a view by the remote telematics device through windshield 18 to incoming light radiation from the sun as the vehicle travels along routes. One will appreciate that the term remote is used in reference to the telematics device to indicate separation from diagnostics dongle 4. The term remote may also be used to describe a server that is located separately from the vehicle cockpit 2, such as at a permanent data center located in a central location such as a large urban area that serves a large region. In addition to mounting on mirror 12 or sun visor 16, a remote telematics device may also be mounted, or placed into, cup holders 20 or 22. Cup holders may, or may not, provide an optimum location for a remote telematics device that uses solar radiation to recharge its batteries, but if driving along a route where sun light is incident from the left or the right of vehicle cockpit 2, cup holders, or other locations within the cockpit may provide a satisfactory location. In addition, if a user device, such as a personal smartphone, or similar device, is configured to operate and perform as a remote telematics device, cup holders may present a convenient means for locating a remote telematics device. Turning now to FIG. 2, the figure illustrates a remote telematics device 10 clipped to the back of rear view mirror 12. Retaining clips 24 retain device 10 to mirror 12. The remote telematics device 10 includes emergency button 25 and non-emergency call button 27, microphone 29 and indicator lights 32. These indicator lights 32 can indicate various operational metrics. For example, lights 32 can indicate battery health (i.e., voltage) of an internal battery of device 10. Furthermore, lights 32 can monitor output power from a solar panel, as will be discussed in reference to FIG. 3.

Figure 3:
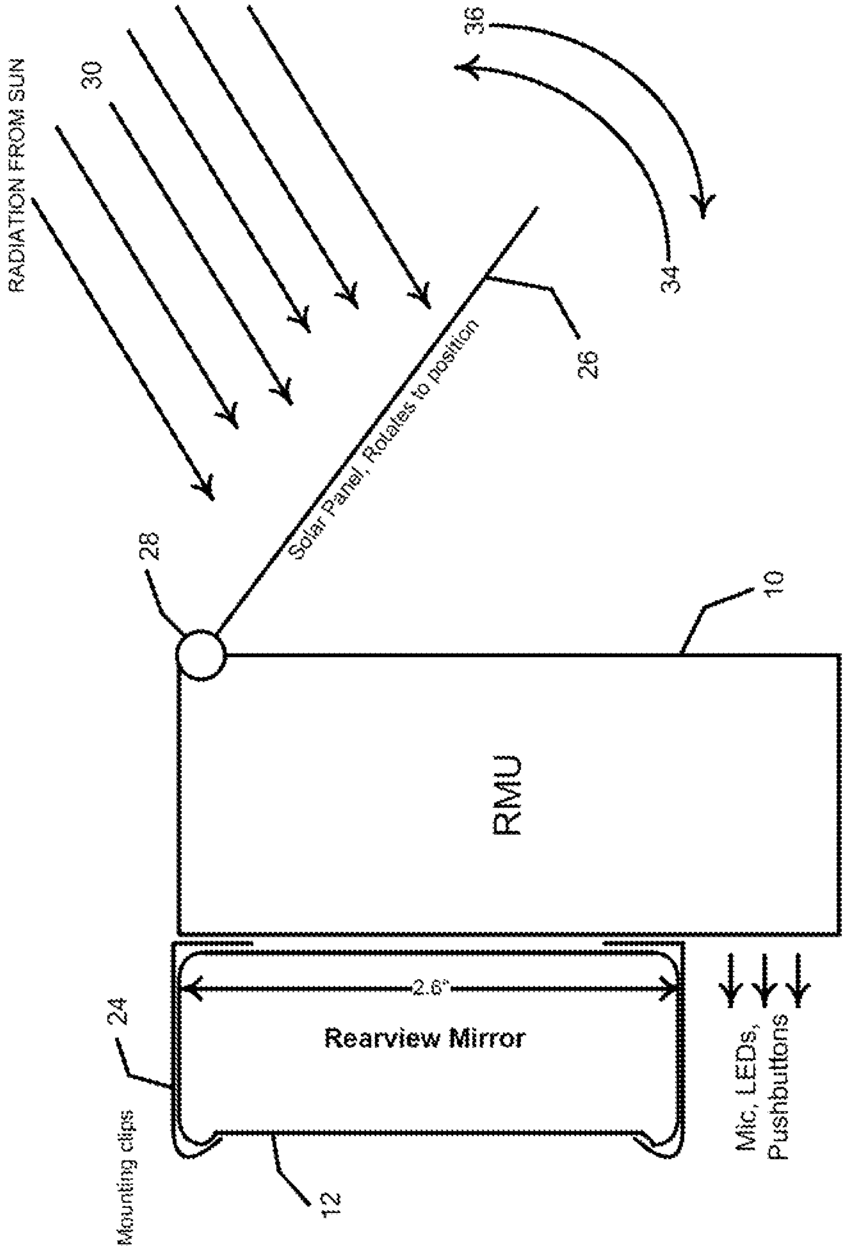
FIG. 3 illustrates a side elevation view of a remote telematics device clipped to the back of a rear view mirror.

Turning now to FIG. 3, the figure illustrates a side elevation view of a remote telematics device 10 clipped to mirror 12 with clips 24. In addition, solar panel 26 attaches to telematics device 10 with a hinged connection 28. Hinged connection 28 permits adjustment of panel 26 to optimize alignment with incoming light rays 30, for example light radiation from the sun. Instead of using hinged joint 28, panel 26 may be mounted to device 10 with an articulating connection, such as a double hinge mechanism, or a double ball-and-socket mechanism, to permit more freedom of motion, which could facilitate better perpendicular alignment with incoming radiation 30. As discussed in reference to FIG. 2, lights 32 can indicate the output power of panel 26. For example, when power output is at a maximum with respect to a predetermined value, the center light of lights 32 may illuminate. Continuing with description of FIG. 3, if panel 26 is rotated about hinge 28 too far in the direction of rotation 34, the left of lights 32 might illuminate. Or, if panel 26 is rotated about hinge 28 too far in the direction of rotation 36, the right of lights 32 might illuminate. Thus, lights 32 would provide a user with visual feedback to facilitate optimizing the orientation of panel 26 with respect to incoming sun light 30 to maximize power conversion and thus output of the solar panel, or cell.

Furthermore, the processor of device 10 that controls the output of lights 32 may also use a power output signal representing the power output of panel 26 to generate a control signal that controls a motor coupled to the panel at hinge 28, or with a rod to the flat portion of the panel, to adjust the angle of the panel in either direction 34 or 36 to automatically optimize power output of the solar panel as the vehicle travels along a route. The reference value for the maximum output of panel 26 may be determined based on a default value. Preferably, the processor of telematics device 10 can obtain information over a long range wireless communication network to more accurately determine a reference maximum output level from panel 26. For example, based on the vehicle current latitude, longitude, and elevation, which device 10 would acquire from an internal (to the device) location determination component, such as a GPS processor, the processor of device 10 could request over the long range wireless communication network current sun strength for its location from a central server, such as may be operated by NASA. In addition, the sun strength could be used as a factor along with current cloud cover, which device 10 could retrieve from a weather server over the long range wireless communication network. And, finally, device 10 could apply an attenuation factor for attenuation attributable to tinting of windshield 18, shown in FIG. 1. Continuing with discussion of FIG. 3, device 10 would accordingly have a reasonably accurate maximum value of how much power should be incident on panel 26 if the panel is aligned perpendicularly to radiation 30, and could use the maximum power value as a reference for automatically adjusting the angle of the solar panel to achieve maximum power output of the panel. The processor could use the same maximum value as a reference in illuminating lights 32 is a user manually manipulates the orientation of panel 26 about hinge 28.

Figure 4:
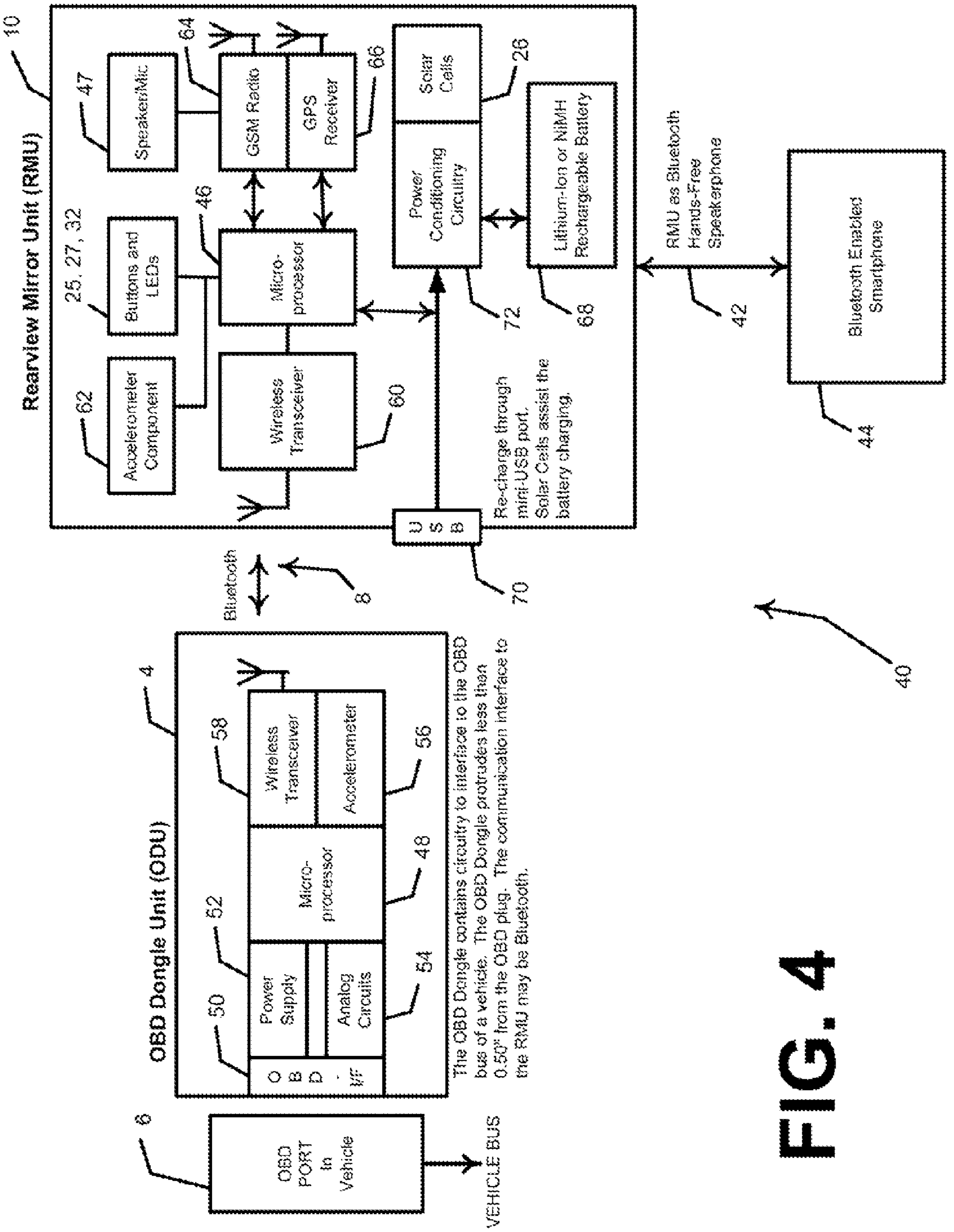
FIG. 4 illustrates a component block diagram of a system for performing telematics, including a diagnostics dongle and a remote telematics device.

Turning now to FIG. 4, the figure illustrates a component block diagram of a system 40 for performing vehicle telematics functions and application, including a diagnostics dongle 4 that plugs into diagnostics port 6, and a remote telematics device 10. Dongle 4 and telematics device 10 communicate with one another via Bluetooth link 8 to facilitate the telematics device being located remote from the dongle.

The figure also shows a short range wireless Bluetooth link 42 for communicating between telematics device 10 and a user's smartphone 44. One skilled in the art will appreciate that smartphone 44 can include the components of, and perform the functions of, telematics device 10. In such a scenario, dongle 4 and smartphone 44 would communicate directly with one another over link 8, and device 10 would be superfluous. Smartphone 44 would be configured with applications to perform telematics operations and functions, as well as transmitting the output of those applications to a central server via a long range wireless link and receiving voice and data information from a central server via the long range wireless link. In other words, a smartphone, tablet, or similar device, can be used in place of a custom designed/built telematics device because a smartphone typically includes all of the components shows in the block diagram of device 10.

Preferably, dongle 4 and smartphone 44 (as well as telematics device 10) support, and communicate according to, Bluetooth serial port profile ("SPP"). However, if one, or both, of the devices communicating with one another do not support SPP, other Bluetooth profiles, such as Personal Area Network ("PAN"), LAN Access Profile ("LAP"), Dial-up Networking Profile ("DUN"), Phone Book Access Profile ("PBAP", or "PBA"), or even the common Hands-free Profile ("HFP") and Advanced Audio Distribution Profile ("A2DP") may be used to transfer diagnostics data from the dongle to the telematics device, and from the telematics device to the dongle.

For example, if devices at either end of link 8 support PAN, one would act as a server and the other as a client and transmit data back and forth accordingly. Similar operation would occur if link 8 was established according to DUN.

Some smart phones may not support SPP, or networking profiles, but may support PBAP or PBA for syncing phone numbers and associated names. Dongle 4 could package diagnostic data as phone number information and transmit it to the telematics device 10, which could have an application that transforms the data from a phone book format to a data packet format suitable for use by a telematics application at either the remote telematics device in the vehicle, or at a centrally located remote telematics server that receives information from the telematics device. In another embodiment, using the HFP profile, dongle 4 could encode diagnostic data as tones, such as DTMF tones, and transmit the diagnostic and other control data and information tones, which the receiving Bluetooth device could decode and retrieve the data from.

In the embodiment shown in the figure, speakers and microphones, shown as block 47, provide a user interface for voice calls so that a user does not need to hold smartphone to his, or her, head to talk while driving and device 10 performs typical vehicle diagnostics operations. Processor 46 can perform myriad processing operations, including general computing, voice compression and decompression algorithms, and management of various components, application, processes, and firmware of telematics device 10. By using processor 46 in remote (from dongle 4) telematics device 10, dongle 4 need only handle reduced functionality and thus can use a smaller processor 48 than if it had to perform voice and data modem and processing functions. In addition to using a less capable processor 48, by using GSM radio circuitry, or other long range wireless circuitry, in the remote telematics device 10, designers can further reduce the size of dongle 4. Thus, dongle 4 has interface circuitry and connectors 50 for interfacing with diagnostic port 6, power conditioning circuitry 52, and analog circuitry 54, such as filters and voltage transformation circuits. Dongle 4 also includes accelerometer components 56, which preferably includes a three-axis accelerometer integrated circuit chip, and short range wireless transceiver 58 for establishing and facilitating communication over link 8. Wireless transceiver 58 may transmit data received from diagnostic port 6 and accelerometer 56 over link 8 to short range wireless transceiver 60 of remote telematics device 10. Transceiver 58 also can receive information, such as messages requesting information, and control messages that dongle 4 can then transmit through the diagnostics port 6 to a vehicle bus, such as a CAN bus, or similar. Such a control message can be used to perform various vehicle functions, such as restrict fuel flow, lock/unlock doors, raise or lower windows, start or stop a climate control system, control an active handling system, cause an alarm system to operate, steer a steering system, operate a braking system, turn on headlights, sound a horn or alarm device, operate a fuel throttle, control spark timing or fuel injection duty cycle, magnitude of injection pulse, and various other vehicle operation and control functions. Device 10 can also forward acceleration information from accelerometer 62 to dongle 4 over link 8, or to a remote server over a long range wireless communication link using long range wireless circuitry 64.

In remote telematics device 10, processor 46 can control long range radio circuitry 64 and GPS circuitry 66. One of ordinary skill will appreciate that long radio circuitry may be included in processor circuitry 46, or at least may be provided by a vendor as a composite module that includes voice processing and general microprocessor capabilities. In addition, GPS, or other location determining circuitry, may also be included with either long range circuitry 64 or processor 46. But, for clarity of description, FIG. 4 shows these components separately.

Since GPS radio circuitry typically consumes a large amount of power relative to other processes, components, and application that processor 46 handles, battery 68 can be charged with power received via a standard computer connector 70, such as, for example, a USB connector, or the like. If USB power is not available at connector 70, solar cells 26 can supplement battery 68 to reduce drain caused by GPS operation. Or, if GPS circuitry 66 is not used, solar cells 26 can charge battery 68. Power conditioning circuitry 72 manages power input from connector 70, solar cells 26 and battery 68, to ensure proper voltage is delivered to processor 46 and other components of device 10. Also, conditioner can detect voltage changes from solar cells 26 to facilitate adjusting the angle of the solar cells, or panel, relative to incident light radiation to maximize output from the cells as discussed above in reference to FIG. 3.

Figure 5:
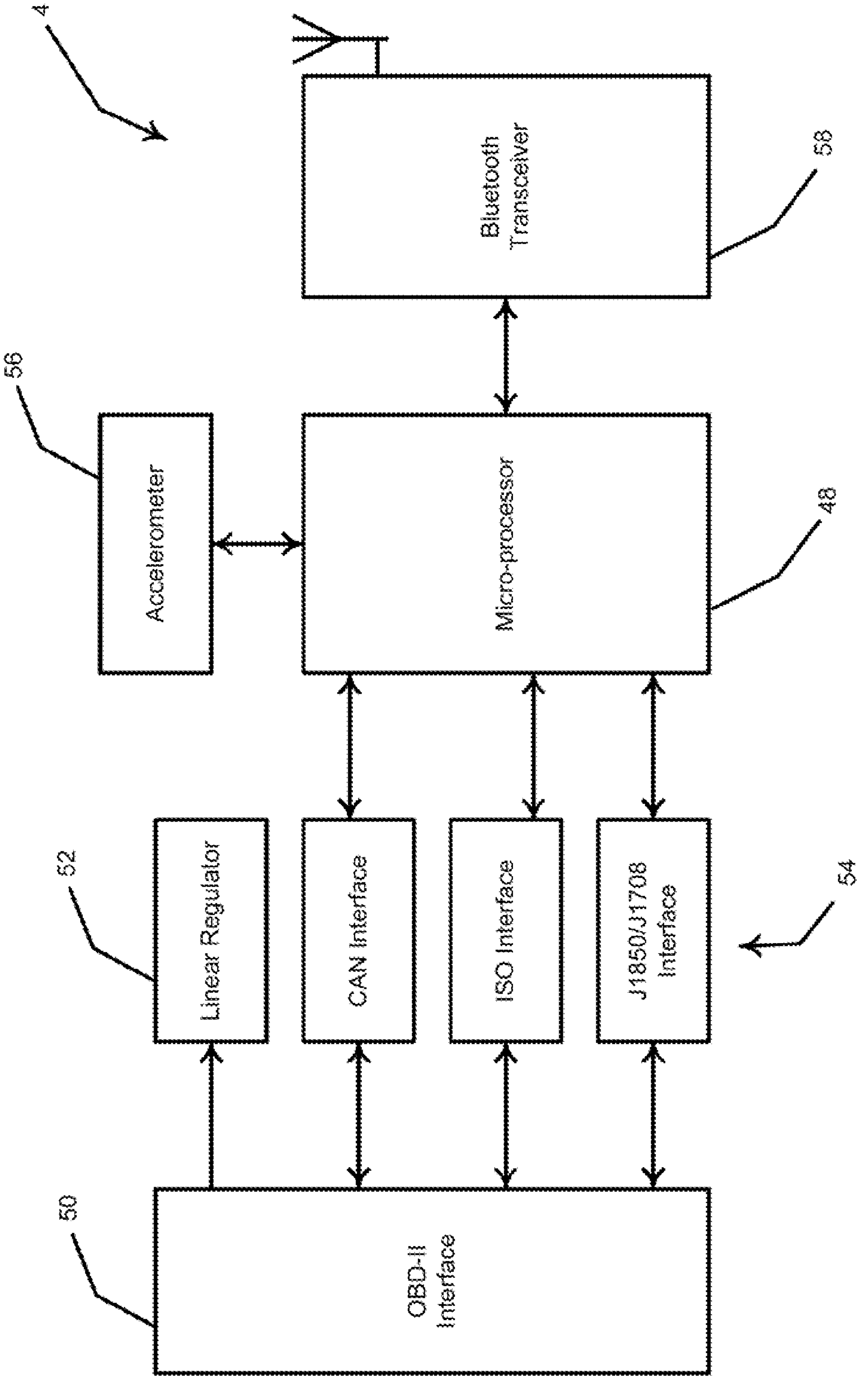
FIG. 5 illustrates a block diagram of a diagnostics dongle.

Turning now to discussion of FIG. 5, the figure illustrates some components that compose dongle 4. Many of the components shown in the figure are described elsewhere herein in connection with the discussion of FIG. 4. Therefore, further description is not given. FIG. 5 shows analog circuits 54 as a variety of interfaces. These interfaces 54 include circuitry for interfacing with different types of diagnostic busses. The interfaces 54 may include resistors and other circuit components that change voltages, condition voltage signals from the bus, and may also adapt different pin schemes of corresponding different protocols, (e.g., Controller Area Network, or CAN; ISO protocols; and SAE J1850/J1708, et. al.).

Processor 48 can determine when signals from accelerometer correspond with vibrations generated by the vehicle when a door closes, or when the engine starts, or when other predetermined trigger events occur based on a accelerometer signal signature that correlates with a given trigger event. When processor 48 determines that a trigger event has occurred, it can initiate a communication link, or session, between short range wireless transceiver 58 and a complementary short range wireless transceiver of a device that is remote from dongle 4. Alternatively, processor 48 can detect a signal received through diagnostic interface 50 that indicates that the vehicle's engine has started, or some other event has occurred. If a vehicle includes more than one short range wireless transceiver device (i.e., dongle 4 and speakers and microphone that communicate via the same short range wireless protocol, such as Bluetooth) a timer can be used to delay the energizing of the speakers and microphone (and their corresponding Bluetooth transceiver) to give priority to a connection between the dongle and a smart phone. Moreover, processor 48 can evaluate signals received from both the diagnostic interface 50 and accelerometer component 56 to form an even more sophisticated trigger determination than using just one or the other. Regardless of the type of trigger, when processor 48 determines that a trigger event has occurred, it can cause transceiver 58 to attempt establishing a communication session with another device that uses the same communication protocol (e.g., Bluetooth, or similar). Another trigger may be recognition by processor 48 that transceiver 58 received an incoming message from a device, such as remote telematics device 10.

Figure 6:
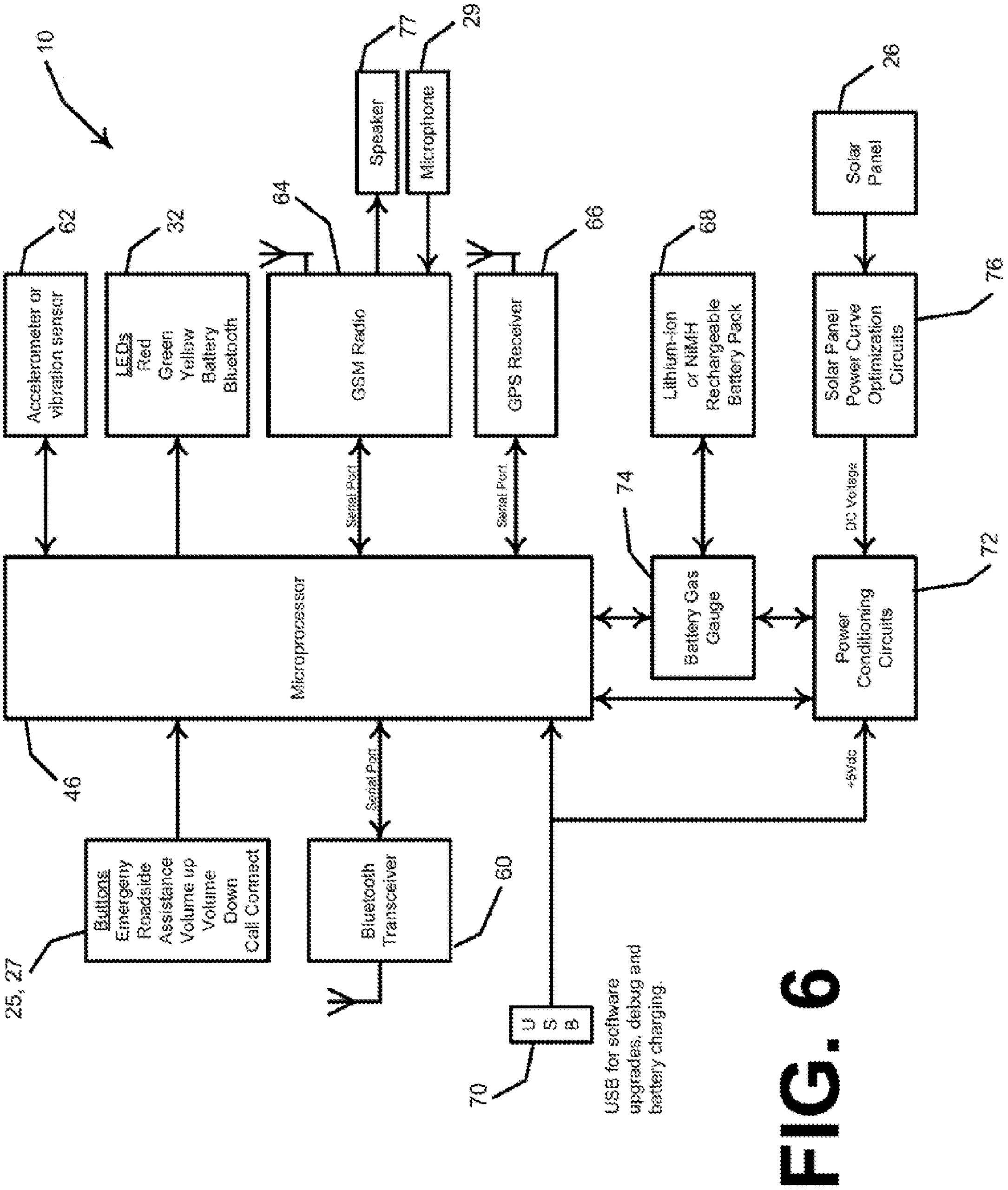
FIG. 6 illustrates a block diagram of a remote telematics device that communicates with a diagnostics dongle via Bluetooth.

Turning now to FIG. 6, the figure illustrates a block diagram of a remote telematics device. Many of the components shown in the figure are also shown in FIG. 4. In addition, battery health monitor, or 'battery gas gauge,' 74 indicates the state of charge of battery 68. Gauge 74 can also indicate the power output of solar panel 26. FIG. 6 also shows solar panel optimization circuits 76. These circuits may be passive, inasmuch as they transform, and/or regulate power from panel 26. In addition, optimizer 76 may include active circuits that tailor an optimization curve based not only on power output from panels 26 but also based on state or charge of battery 68 and power demand from processor 46 and components coupled to it. Thus, gauge circuitry 74 and optimizer 76 can compose part of a power management. system that manages and matches power available from battery 68 and solar panels 26 with current power demand. Power demanded by components of device 10 may be based on actual current draw. In addition, processor may also calculate estimated power demand based on anticipation of establishing a communication link with transceiver 60, or that processor 46 needs to 'wake up' from a sleep state GPS circuitry to obtain location information. Power conditioning circuitry typically includes voltage regulation circuits and may include capacitors that can store energy for providing bursts of energy to GSM radio 54 when it needs to transmit packets of data (typically these bursts may require a brief 2 Ampere current draw), thus permitting the GSM radio to operate on output power from solar panel 26, which typically does not supply an output of 2 amps for the panel sizes that a remote telematics device, or a smart phone would typically use.

Regarding power management, processor 46 can control conditioner circuits 72, in response to input signals from 'gas gauge' or battery/power monitor 74. Or, user input from buttons 26 or 28 could cause processor to illuminate a light 32, red perhaps, to indicate battery 68 cannot provide enough power to send a long range wireless message in response to the button press unless the user plugs in the remote telematics device to USB port 70. Lights 32 can also indicate whether battery 68 has enough power to play an audio file, or message, with speaker 77. Microphone 30 typically would not require power to generate a signal, so lights 32 typically do not indicate status of the battery with respect to capability to operate the speaker. If remote device 10 receives an important audio message that it needs to play, power conditioning circuits 72 can cause a reduction in audio power output to speaker 77 if the stored energy in battery 68 cannot play the message at a currently set volume level.

In addition to indicating power management status, lights 32 can provide a variety of other status indications. For example, different color lights can indicate the strength of a signal received at long range wireless transceiver 64. Or, the different color lights can indicate power/charge status of battery 68. In another aspect, lights 32 can indicate if remote telematics device 10 has compared signals from accelerometer components 62 in remote device 10 to accelerometer components in a dongle, and in response to result of the comparison, generated and transmitted to the vehicle's bus a signal for controlling an active handling system.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. An apparatus, comprising:

a processor configured for processing vehicle information received wirelessly from a vehicle information transceiver device coupled to a vehicle;

a short range wireless transceiver coupled to the processor for receiving the vehicle information from the vehicle information transceiver device;

a energy storage device coupled to the processor and to the short range wireless transceiver, and a light-powered energy source coupled to the energy storage device, wherein the light-powered energy source provides energy for storage in the energy storage device.

2. The apparatus of claim 1 wherein the processor includes circuitry for wirelessly receiving and transmitting signals over a long range wireless communication network.

3. The apparatus of claim 1 wherein the short range wireless transceiver is configured to transmit and receive signals according to a Bluetooth® protocol.

4. The apparatus of claim 1 wherein the energy storage device is a battery.

5. The apparatus of claim 1 wherein the light-powered energy source includes one or more a solar cells.

6. The apparatus of claim 1 further comprising a housing and a movable means that couples the light-powered energy source to the housing for allowing adjustment of a position of the light-powered energy source relative to the housing.

7. The apparatus of claim 6 further comprising an adjustment means, coupled to the light-powered energy source and to the processor, for receiving an alignment signal from the processor and causing automatic adjustment of the position of the light-powered energy source relative to the housing based on an output energy level from the light-powered energy source, wherein the processor monitors the output energy level of the light-powered energy source and provides the alignment signal to the adjustment means.

8. The apparatus of claim 7 further comprising an energy storage device indicator that includes an interface that indicates a quantity of energy stored in the energy storage device.

9. The apparatus of claim 8 wherein the energy storage device indicator is configured to indicate an output energy level of the light-powered energy source.

10. The apparatus of claim 1 wherein the energy storage device includes a capacitor.

11. A system, comprising:

a vehicle information transceiver device that includes a first processor coupled to: a first short range wireless transceiver, a first accelerometer component, and an interface for coupling to a vehicle bus; and a remote telematics device that includes:

a second processor configured for processing vehicle information received wirelessly from the vehicle information transceiver device;

a second short range wireless transceiver coupled to the second processor for receiving the vehicle information from the vehicle information transceiver device;

a second accelerometer component coupled to the second processor;

an energy storage device coupled to the second processor and to the second short range wireless transceiver;

a long range wireless transceiver coupled to the second processor; and a light-powered energy source coupled to the energy storage device, wherein the light-powered energy source provides energy for storage in the energy storage device.

12. The system of claim 11 wherein the vehicle information transceiver device transmits vehicle information from the vehicle bus to the remote telematics device after the first accelerometer component detects that a trip in a vehicle has begun.

13. The system of claim 11 wherein the remote telematics device and the vehicle information transceiver device establish a communication link via the first short range wireless transceiver and the second short range wireless transceiver when both the first accelerometer component and the second accelerometer component indicate that a trip in a vehicle has begun.

14. The system of claim 13 wherein the first accelerometer component and the second accelerometer component detect that the trip in the vehicle has begun upon substantially detecting vibration that correlates with an engine of the vehicle starting.

15. The system of claim 11 wherein the vehicle information transceiver device further comprises an energy level determining system that permits establishment of a communication link between the first short range wireless transceiver and the second short range wireless transceiver when either the energy stored in the energy storage device is adequate to supply power to the long range wireless transceiver, or the light-powered energy source can provide enough power, either alone, or in combination with the energy storage device, to adequately supply power to the long range wireless transceiver to transmit vehicle information received from the vehicle information transceiver device.

16. A method, comprising:

determining with a vibration detecting component of a remote telematics device that an engine of a vehicle in which the remote telematics device is located has started;

establishing a communication session over a short range communication link with a vehicle information transceiver device upon determination that the engine has started;

receiving vehicle information from the vehicle information transceiver device over the short range communication link;

determining whether the remote telematics device can transmit the vehicle information over a long range wireless communication link if energy stored in an energy storage device of the remote telematics device and an energy contribution from a light-powered energy source of the remote telematics device can provide enough energy to transmit the vehicle information over the long range wireless communication link;

providing energy from the energy storage device to a long range wireless transceiver of the remote telematics device; and transmitting the vehicle information over the long range wireless communication link if a combined energy from the energy storage device and light-powered energy source can support transmitting the vehicle information over the long range wireless communication link.

17. The method of claim 16 wherein the energy storage device includes a capacitor.

18. The method of claim 17 further comprising automatically transmitting by the remote telematics device an alert message if a roll angle value corresponding to a determined roll angle exceeds a predetermined value, wherein a processor of the remote telematics device delays the transmitting of the alert message until the light-powered energy source charges the capacitor to provide enough energy to transmit the alert message over the long range wireless communication link.

19. The method of claim 16 further comprising:

comparing in the remote telematics device an acceleration signal value from an accelerometer component contained in the remote telematics device with an acceleration signal value contained in the received vehicle information generated by an accelerometer component contained in the vehicle information transceiver device to determine a roll angle of the vehicle; and transmitting a roll angle value corresponding to the determined roll angle with the received vehicle information over the long range wireless communication link.

20. The method of claim 19 further comprising automatically transmitting by the remote telematics device an alert message if the roll angle value corresponding to the determined roll angle exceeds a predetermined value.

* * * * *